United States Patent

Date et al.

[15] 3,669,938

[45] June 13, 1972

[54] REMOVAL OF VOLATILES FROM POLYAMIDES

[72] Inventors: Raghunath V. Date, Woodbridge; George R. Furness, Dunellen, both of N.J.

[73] Assignee: Celanese Corporation, New York, N.Y.

[22] Filed: March 17, 1970

[21] Appl. No.: 20,393

[52] U.S. Cl. ............................................. 260/78 R, 260/78 A
[51] Int. Cl. ........................................................... C08g 20/20
[58] Field of Search .................................................. 260/78 R

[56] References Cited

UNITED STATES PATENTS 2,130,523  9/1938  Carothers ............................ 260/78 R
3,193,535  7/1965  Carter ................................... 260/78 R

*Primary Examiner*—Harold D. Anderson
*Attorney*—Thomas J. Morgan, Linn I. Grim and Richard A. Lucey

[57] ABSTRACT

An improved method for facilitating removal of volatile materials from polyamides to be used in molding operations, without effecting the polyamide's relative viscosity or impairing its physical properties, is presented wherein the polyamide forming monomer is polymerized in the presence of small quantities of 1,4 diaminocyclohexane adipate.

2 Claims, No Drawings

3,669,938
REMOVAL OF VOLATILES FROM POLYAMIDES

1. Field of the Invention

This invention relates to linear polyamide polymers to be used in molding operations. More particularly it relates to a method for facilitating removal of volatile materials from polyamides to be used in molding operations without effecting the polyamide's relative viscosity or physical properties.

The term linear polyamide as used herein is meant to include synthetic linear polyamides which can be prepared from polyamide forming monomers such as monoaminocarboxylic acids, their amide-forming derivatives, or from suitable diamines and suitable dicarboxylic acids or amide-forming derivatives of these compounds. The polyamides produced having recurring amide groups as an integral part of the main polymer chain and the recurring intra-linear carbonamide groups in these polyamides are separated by hydrocarbon groups containing at least two carbon atoms. Synthetic linear polyamides which can be prepared according to the method of this invention are all those of the nylon type having a relative viscosity between 15 and 400, and preferably between 40 and 140, as measured in a solution of 2 grams of the polyamide in 21.8 grams of a 90 percent formic acid solution.

Preparation of such polymers is typically illustrated in U.S. Pat. Nos. 2,071,200; 2,071,253; 2,130,948; 2,285,009; 2,361,717; 2,512,606; 3,193,535; and 3,431,236 among others.

Particular polyamides which can be prepared according to the method of this invention include, among others, polyhexamethylene adipamide, polyhexamethylene sebacamide, polymerized 6-aminocaproic acid, polytetramethylene adipamide, polytetramethylene sebacamide, and polyadipamides prepared from di (4-aminocyclohexyl) ethane or 1,6-di (4-aminocyclohexyl) hexane as the diamine component.

2. Description of the Prior Art

In a batch or a continuous process for the production of polyamides where the monomer is fed to a reactor as a water solution, or wherein the polymerization is a condensation reaction which involves the liberation of water or other low molecular weight condensation by product, the resulting water or by product must be separated from the polyamide before the polyamide can be used in a subsequent molding operation.

The means used for removing these volatile components from the polyamide invariably require a step in the polymerization process wherein the polyamide is introduced into a zone of reduced, subatmospheric pressure wherein the volatiles volatilize more readily. Ideally it would be desirable to have the pressure in this zone as low as possible, or in other words, have the subatmospheric pressure or vacuum in this zone as high as possible, to facilitate volatilization of the volatile components of the polymerizing polyamide medium. Practically, however, the subatmospheric pressure which can be employed in this subatmospheric pressure zone is fixed by the relative viscosity of polyamide desired. If the pressure in this zone is lowered to facilitate volatilization of volatile materials, the relative viscosity of the polyamide thus produced will be increased. This increase in relative viscosity of the polyamide will manifest itself by altering the physical properties of articles formed from the polyamide in a subsequent molding operation, i.e., extrusion or injection molding.

It has been discovered that a lower pressure can be employed to facilitate volatilization of volatile materials from the polyamide, at a given relative viscosity of polyamide, without effecting the physical properties of the polyamide, if a small amount of 1,4 diaminocyclohexane adipate is included with the polyamide monomer feed introduced into a polymerizer.

SUMMARY OF THE INVENTION

The invention is accomplished by incorporating from about 0.01 to about 3.0 weight percent and preferably from about 0.3 to about 0.8 weight percent of 1,4 diaminocyclohexane adipate, based upon the polyamide forming monomer, into the polyamide forming monomer feed solution.

For example, in the continuous polymerization process for producing polyamides as described in U.S. Pat. No. 3,193,535, wherein a polyamide forming monomer solution is introduced into a long narrow tube heated to polymerization temperatures wherein the pressure is superatmospheric, amounting to at least 14 atmospheres at the entry end thereof, and wherein the pressure continuously decreases along the tube until at the exit end the pressure is atmospheric or subatmospheric, the 1,4 diaminocyclohexane adipate could be incorporated along with the polyamide forming monomer before the feed solution containing said polyamide forming monomer is introduced into said long narrow tube.

The 1,4 diaminocyclohexane adipate may be added to the polyamide monomer feed in any way known to those skilled in the art, but preferably the 1,4 diaminocyclohexane adipate should be in a solution form, and most preferably in a solution wherein the solvent is the same solvent used for the polyamide forming monomer. For example, if the polyamide monomer feed is a solution of hexamethylene diammonium adipate salt in water, the 1,4 diaminocyclohexane adipate should be added to the monomer solution as a solution of 1,4 diaminocyclohexane adipate in water, or as a co-solution of 1,4 diaminocyclohexane adipate and hexamethylene diammonium adipate salt in water.

Additionally, it has been observed that approximately 80 weight percent of the 1,4 diaminocyclohexane adipate incorporated into the polyamide monomer feed is incorporated into the final polyamide structure, or from about 0.008 to about 2.4 weight percent based upon the weight of the polyamide.

In order that those skilled in the art may better understand how the present invention can be carried into effect, the following examples are given by way of illustration and not by way of limitation.

EXAMPLE I

A feed solution of 47.8 parts of hexamethylene diammonium adipate salt in 52.2 parts of water was continuously polymerized in a tubular continuous polymerizer such as described in U.S. Pat. No. 3,193,535. The polymerizer was composed of two tubular sections of different diameter, the smaller diameter being at the inlet end.

The pH of a 9.5 weight percent solution of the hexamethylene diammonium adipate salt used, in water, was 7.7, the feed rate of the feed solution to the polymerizer was about 650 milliliters per minute, the temperature of the polymerizer was 284° C., the entrance pressure at the inlet of the polymerizer was about 28 atmospheres absolute, and the excess addition rate of a 50 weight percent solution of hexamethylene diamine in water was 9.7 milliliters per minute.

The pressure in the subatmospheric pressure zone after the discharge port of the second tubular section was set at 650 millimeters of mercury.

The polymer thus produced had a relative viscosity of 50.3, as measured by comparing the viscosity of a solution of 2 grams of polymer in 21.8 grams of a 90 percent solution of formic acid in water to the viscosity of a 90 percent formic acid solution at 25° C.

EXAMPLE II

The procedure of Example I was followed except that the feed solution was 46.8 parts of hexamethylene diammonium adipate salt and 0.24 parts of 1,4 diaminocyclohexane adipate in 53.2 parts of water.

The relative viscosity of the polymer thus produced was 46.4.

This example describes that at a given pressure in the subatmospheric pressure zone, the incorporation of 1,4 diaminocyclohexane adipate into the hexamethylene diammonium adipamide salt feed into the polymerizer produces a polyhexamethylene adipamide of lower relative viscosity.

EXAMPLE III

The procedure of Example II was followed except that the pressure in the subatmospheric pressure zone was lowered to prepare a polyamide with approximately the relative viscosity of the polyhexamethylene adipamide of Example I, namely 50.3.

When the pressure in the subatmospheric pressure zone was set at 550 millimeters of mercury a polyhexamethylene adipamide with a relative viscosity of 51.0 was prepared.

This example describes that a polyhexamethylene adipamide with a desired relative viscosity can be prepared, using a lower pressure in the subatmospheric pressure zone to facilitate volatilization of volatiles, by including 1,4 diaminocyclohexane adipate into the hexamethylene diammonium adipate salt feed into the polymerizer.

EXAMPLE IV

The physical properties of the polymer of Example I, were compared to the physical properties of the polymer of Example III, using ASTM procedures, and the results are set forth in Table I.

This example describes that the incorporation of 1,4 diaminocyclohexane adipate into the hexamethylene diammonium adipate salt feed does not significantly effect the physical properties of the thus produced polyhexamethylene adipamide.

Speciments used for physical testing were molded on a New Britian 3-ounce screw injection molding machine with an ASTM family mold. 010000

What is claimed is:

1. In a method for the production of a linear polyhexamethylene adipamide to be used in molding operations wherein an aqueous monomer feed solution of hexamethylene diammonium adipate salt is polymerized to a polyamide having a relative viscosity between 15 and 400, as measured in a solution of 2 grams of the polyamide in 21.8 grams of a 90 percent formic acid solution and wherein as one operation in said polymerization, the polymerizing monomer feed is exposed to a zone of subatmospheric pressure to remove excess water from said polyhexamethylene adipamide, the improvement which comprises polymerizing said hexamethylene diammonium adipate in the presence from about 0.01 to about 3.0 weight percent of 1,4-diaminocyclohexane adipate.

2. The improved method of claim 1 wherein said polymerization is a continuous polymerization.

* * * * *

UNITED STATES PATENT OFFICE
CERTIFICATE OF CORRECTION

Patent No. __3,669,938__ Dated __June 13, 1972__

Inventor(s) __Raghunath V. Date and George R. Furness__

It is certified that error appears in the above-identified patent and that said Letters Patent are hereby corrected as shown below:

In the specification at Column 4, insert before the claims "Table I". (See attached Sheet).

Signed and sealed this 6th day of March 1973.

(SEAL)
Attest:

EDWARD M. FLETCHER, JR.
Attesting Officer

ROBERT GOTTSCHALK
Commissioner of Patents

Patent No. 3,669,938
(2)

TABLE I

| | Melting Point °C | Tensile Strength, Yield (10³ psi) | Elongation, Yield (%) | Work Energy Yield (inch-pounds) | Flexural Strength 5% Strain (10³ psi) | Notched Izod Impact (ft-lb/in Notch) | Hardness Rockwell M |
|---|---|---|---|---|---|---|---|
| A* | 265 | 12.9 | 5 | 176 | 16.2 | 0.8 | 87 |
| B* | 263 | 12.6 | 4 | 164 | 16.2 | 0.8 | 86 |

*A is a sample molded from the polymer of Example I

*B is a sample molded from the polymer of Example III